United States Patent [19]

Ikemori

[11] 4,437,746
[45] Mar. 20, 1984

[54] PHOTO METERING DEVICE FOR SINGLE LENS REFLEX CAMERA

[75] Inventor: Keiji Ikemori, Yokohama, Japan
[73] Assignee: Canon Kabushiki Kaisha, Tokyo, Japan
[21] Appl. No.: 361,838
[22] Filed: Mar. 25, 1982
[30] Foreign Application Priority Data Apr. 9, 1981 [JP] Japan .................................. 56-53592

[51] Int. Cl.³ ............................................... G03B 7/00
[52] U.S. Cl. .................................................. 354/479
[58] Field of Search ................ 354/23 R, 59; 350/505

[56] References Cited
U.S. PATENT DOCUMENTS 4,170,410 10/1979 Sekida et al. .......................... 354/59
4,174,894 11/1979 Fukuhara et al. ..................... 354/59

OTHER PUBLICATIONS

"Nijborg Schmidt–Cassegrain Telescope", *Sky and Telescope*, Nov. 1976, pp. 382–385.

*Primary Examiner*—Russell E. Adams
*Attorney, Agent, or Firm*—Toren, McGeady and Stanger

[57] ABSTRACT

In the disclosed device, light radiated from an object image formed on the focal plane by an objective lens is directed to a photo-cell using a condenser lens. The condenser lens has reflection areas formed in portions of the surfaces thereof. According to an embodiment, the surface closer to the oncoming light is mirrored at the central portion and the more remote surface is mirrored marginally. In another embodiment, the more remote area is recessed to receive the photo-cell.

5 Claims, 4 Drawing Figures

4,437,746

PHOTO METERING DEVICE FOR SINGLE LENS REFLEX CAMERA

BACKGROUND OF THE INVENTION

1. Field of the Invention

This invention relates to photo metering devices for single lens reflex cameras wherein the reflected light from the curtain of the focal plane shutter, or the film surface is metered to derive a light value based on which exposure control is made.

2. Description of the Prior Art

It has already been known to provide a photo metering optical system comprising a photo-cell and a condenser lens system arranged on the bottom wall of the mirror box in the camera so that the reflected light bundle from the shutter curtain, or the film surface is focused on the photo-cell by the condenser lens system. This photo metering method was generally adapted to put a relatively heavy emphasis on the central portion of the picture frame of film by making the condenser lens system to have a focal length somewhat shortened with an increase in the relative aperture. And, in the condenser lens system there was need of using a plurality of convex lenses in order to correct, among other various aberrations, particularly spherical aberration. A method of good correction of the spherical aberration by using an aspheric surface in one of the optical members was also adopted.

However, the use of a plurality of convex lenses leads to an increase in the bulk and size of the condenser lens system and to make it more difficult to perform their adjustment. The use of the aspheric surface also gives rise to a drawback that the production cost of the lens is increased.

SUMMARY OF THE INVENTION

It is an object of the present invention to provide a photo metering device using a condenser lens system of simple structure amenable to low unit cost production techniques which has overcome the above-described drawbacks. One of the features of the invention is that the optical system is made to be in the form of a catadioptric optical system as obtained by changing portions of the refracting members constituting the condenser lens system to mirrored surfaces.

DESCRIPTION OF THE PREFERRED EMBODIMENTS

The present invention is described in connection with embodiments thereof by reference to FIGS. 2 to 3, after some explanation is given to the prior art photo metering optical system of FIG. 1.

Figure 1:
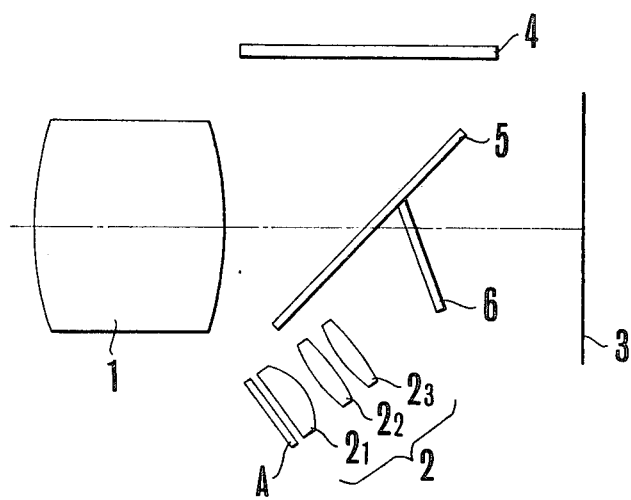
FIG. 1 is a schematic sectional view illustrating the conventional photo metering optical system.

FIG. 1 shows an objective lens; 1, a focusing screen; 4, a pivotal mirror; 5, a sub-mirror; 6, a film plane or a shutter curtain; 3, a condenser lens system 2 comprising three convex lenses $2_1$, $2_2$ and $2_3$. One of the surfaces of the first convex lens $2_1$ may be an aspheric surface as necessity arises. Member A is a photo-sensitive element.

The position of FIG. 1 is under observation of a finder image.

When the pivotal mirror 5 lies in the position illustrated, light coming from an object to be photographed and entering the objective lens 1 and the pivotal mirror 5 is reflected by the sub-mirror 6, is made to converge on the photo-sensitive element A by the condenser lens system 2.

With the pivotal mirror 5 in the non-viewing position when a photograph is shot, light radiated from the shutter curtain or film surface 3 is condensed on the photo-sensitive element A by the lens system 2.

Figure 2:
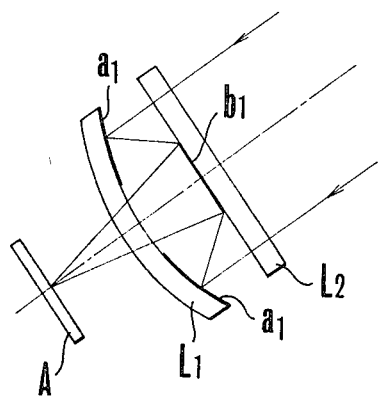
FIGS. 2, 3 and 4 are schematic sectional views of three different embodiments of the photo metering optical system according to the present invention.
Figure 3:
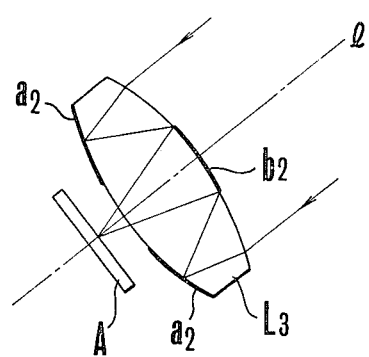
Figure 4:
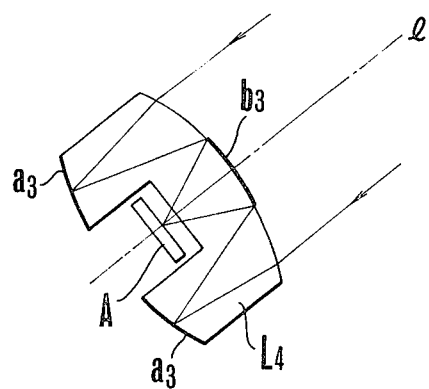

FIGS. 2 to 4 in schematic views illustrate three different examples of a catadioptric type of lens systems used as the condenser lens system of the photo metering optical system of the invention. This catadioptric type lens system replaces the condenser lens system 2 of FIG. 1.

In the embodiment of FIG. 2, a lens L1 is mirrored in a marginal zone a1, of the front surface thereof, and another lens L2 is also made mirrored in a central portion b1, of the rear surface thereof. The optical axes 1 of the reflection surfaces a1 and b1 coincide with each other. A light bundle passing through the lens L2 is reflected by the reflection surface a1 of the lens L1 to the reflection surface b1 of the lens L2, and further reflected therefrom to the lens L1 by which it is refracted and made to converge on the photo-sensitive element A.

The embodiment of FIG. 3 employs only one lens element L3, both of the surfaces of which are made mirrored in portions a2 and b2 thereof. A light bundle entering the lens L3 at the marginal zone of the front surface thereof is reflected from the reflection surface a2 to the opposite reflection surface b2 and further reflected therefrom to pass through the central area of the rear surface, and converges on the photo-sensitive element A. This embodiment is suited for use with a lens of large relative aperture.

The embodiment of FIG. 4 is similar to that of FIG. 3, but differs from the latter in that a lens L4 provided with a recessed portion at the center of the rear surface thereof is used with the photo-sensitive element A buried in the recessed portion. This produces the advantage of achieving an improvement in the compactness of the photo metering optical system. The arrangement of the mirrored areas a3 and b3 on both the surfaces of the lens element L4 is the same as in FIG. 3 embodiment.

The above embodiments have been illustrated as two reflection areas applied on one or two refracting member or members. It is, however, to be understood that three or more reflection areas may be formed with the use of a plurality of refracting members to effect an equivalent result. It is also possible to selectively control the photo metering pattern on the film plane, for example, between the average and spot metering ones by exchanging an additional optical member at the front of the condenser lens. Further, it is easier to achieve a decrease in the bulk and size of the photo metering optical system when an optical system comprising the reflection surfaces is formed with its optical axis off-set to permit a change in position of the photo-sensitive element.

The present invention uses a condenser lens system with refracting members partly mirrored to achieve a reflecting and refracting system that in comparison with the prior art condenser lens system includes only refracting optical members. It permits the total length of the lens system to be remarkably shortened, and because the radii of curvature of the reflection surfaces can be made large, good correction of spherical aberration can be performed more easily thanks to the shortening of the focal length and the increase of the relative aperture.

What is claimed is:

1. A photo metering device for a single lens reflex camera comprising:
   (a) a photographic optical system for forming an object image on an image receiving means;
   (b) a photo sensor for receiving light from the object;
   (c) a biconvex condenser lens system arranged between said image receiving means and said photo sensor, and having a first spherical surface and a second spherical surface;
   (d) first reflective means formed on the center zone of said first spherical surface; and
   (e) second reflective means formed on the center zone of said second surface arranged so that light from the object image is reflected by said first reflective means and said second reflective means and directed to the photo sensor.

2. A device as in claim 1, wherein said condenser lens system defines an optical axis, said condenser lens system being arranged symmetrically about the optical axis, and said marginal and said center zones being arranged symmetrically about the optical axis.

3. A device as in claim 2, wherein said lens system includes a plurality of elements, each having one of the surfaces.

4. A device as in claim 2, wherein said lens system includes a single element having the pair of surfaces.

5. A device as in claim 4, wherein said biconvex condenser lens system includes a central recess projecting into the first spherical surface and said photo sensor is located in said recess.

* * * * *